(12) United States Patent
Xu

(10) Patent No.: US 10,872,081 B2
(45) Date of Patent: Dec. 22, 2020

(54) REDIS-BASED DATABASE DATA AGGREGATION AND SYNCHRONIZATION METHOD

(71) Applicant: MOLBASE (Shanghai) Biotechnology Co., Ltd., Shanghai (CN)

(72) Inventor: Chang Gen Xu, Shanghai (CN)

(73) Assignee: MOLBASE (SHANGHAI) BIOTECHNOLOGY CO., LTD., Shanghai (CN)

( * ) Notice: Subject to any disclaimer, the term of this patent is extended or adjusted under 35 U.S.C. 154(b) by 334 days.

(21) Appl. No.: 15/904,047

(22) Filed: Feb. 23, 2018

(65) Prior Publication Data

US 2018/0260435 A1 Sep. 13, 2018

(30) Foreign Application Priority Data

Mar. 13, 2017 (CN) .......................... 2017 1 0145129

(51) Int. Cl.
*G06F 16/178* (2019.01)
*G06F 16/242* (2019.01)
*G06F 16/23* (2019.01)
*G06F 16/27* (2019.01)

(52) U.S. Cl.
CPC .......... *G06F 16/244* (2019.01); *G06F 16/178* (2019.01); *G06F 16/23* (2019.01); *G06F 16/275* (2019.01)

(58) Field of Classification Search
CPC ......... G06F 16/178–1794; G06F 16/23; G06F 16/244; G06F 16/27–275
See application file for complete search history.

(56) References Cited

U.S. PATENT DOCUMENTS

| | | | | |
|---|---|---|---|---|
| 6,895,471 B1* | 5/2005 | Tse | ...................... | G06F 16/2308 711/118 |
| 7,203,660 B1* | 4/2007 | Majeed | .............. | G06Q 30/0633 705/14.1 |
| 8,365,138 B2* | 1/2013 | Iborra | ...................... | G06F 8/30 717/104 |
| 8,495,371 B2* | 7/2013 | Baykal | .................... | H04L 63/08 340/5.8 |
| 9,288,056 B1* | 3/2016 | Spagnola | ............ | H04L 63/0823 |
| 9,703,814 B1* | 7/2017 | Shams | .................. | G06F 16/235 |

(Continued)

*Primary Examiner* — Robert W Beausoliel, Jr.
*Assistant Examiner* — Nirav K Khakhar
(74) *Attorney, Agent, or Firm* — Muncy, Geissler, Olds & Lowe, PC

(57) ABSTRACT

In a Redis-based database data aggregation and synchronization method, a synchronization program scans data of a table of a target database, calculates and stores a Key and a Value of each row into a Redis, while writing the row into an aggregation database. When there is a change of data in the table of the target database, the synchronization program re-calculates a new Key and a new Value of each row in the target database and inquires whether a key same as the new Key exists in the Redis to update the data in the aggregation database, and then perform a difference set calculation for the data after the synchronization of the primary key set of the table of the target database and the corresponding primary key set of the table of the aggregation database, and delete the data from the aggregation database by determining whether or an element exists in the difference set.

3 Claims, 2 Drawing Sheets

(56) References Cited

U.S. PATENT DOCUMENTS

| | | | |
|---|---|---|---|
| 2002/0038306 A1* | 3/2002 | Griffin | G06F 16/283 |
| 2003/0130984 A1* | 7/2003 | Quinlan | G06F 9/52 |
| 2005/0080792 A1* | 4/2005 | Ghatare | G06F 16/258 |
| 2005/0125383 A1* | 6/2005 | Gilfix | G06F 16/24552 |
| 2006/0212465 A1* | 9/2006 | Fish | G06F 11/1662 |
| 2013/0097117 A1* | 4/2013 | Lasky | G06F 11/1451 707/624 |
| 2014/0279855 A1* | 9/2014 | Tan | G06F 16/2228 707/609 |
| 2014/0365437 A1* | 12/2014 | Srinivasan | G06F 16/27 707/634 |
| 2015/0032684 A1* | 1/2015 | Gupta | G06F 16/2228 707/600 |
| 2015/0120643 A1* | 4/2015 | Dantressangle | G06F 16/27 707/602 |
| 2016/0179894 A1* | 6/2016 | Gupta | G06F 16/275 707/714 |
| 2018/0095952 A1* | 4/2018 | Rehal | G06F 16/288 |
| 2019/0155801 A1* | 5/2019 | Karunanithi | G06F 16/27 |
| 2019/0340171 A1* | 11/2019 | Zhang | G06F 16/2365 |

\* cited by examiner

REDIS-BASED DATABASE DATA AGGREGATION AND SYNCHRONIZATION METHOD

FIELD OF THE INVENTION

The present invention relates to the field of Internet technology, in particular to a Redis-based database data aggregation and synchronization method.

BACKGROUND OF THE INVENTION

In the present database software technologies, relational databases are well-developed, and many different types of products have been developed and produced, and some of the mainstream relational databases are Oracle, MySQL, PostgreSQL, etc. These databases have their own master-slave structured data synchronization method such as the master-slave data synchronization method bundled with the binlog between the master-slave database of the MySQL, the middleware synchronization method of Otter, etc. However, these databases are still insufficient for aggregating and synchronizing a plurality of databases into a database.

However, most business supporting systems of the present Internet companies are divided into different system according to the business, but when a DW data warehouse platform or a BI platform is created, it is necessary to aggregate the data of each business system into the same database in order to perform the follow-up statistical summary analysis. At present, many data still cannot be aggregated and synchronized into a database, and thus causing tremendous inconvenience to a company's internal business operations.

SUMMARY OF THE INVENTION

Therefore, it is a primary objective of the present invention to overcome the aforementioned drawbacks of the prior art by providing a Redis-based database data aggregation and synchronization method capable of aggregating and synchronizing at least a target database data into an aggregation database.

To achieve the aforementioned objective, the present invention provides a Redis-based database data aggregation and synchronization method for aggregating and synchronizing at least a target database data into an aggregation database, comprising the following steps:

(S1) Use a synchronization program to load the remote connection information of each target database from a configuration file, read a table structure of the target database, fetch a field and primary key information of each table, and create a corresponding table structure in the aggregation database.

(S2) Scan the data of all tables in the target database by the synchronization program, and then calculate a Key and a Value of all rows row by row.

(S3) Use the Key and Value obtained from the step (S2) as the k-v to be cached and written into the Redis, splice the rows of all tables of the target database into a standard "INSERT" SQL statement to be executed and written into a corresponding table of the aggregation database (S4) Execute the step (S2) to obtain a new Value and a new Key when there is a change of data in the table of the target database, and determine whether or not a key of each row same as the new key of the row exists in the Redis, and if yes, then execute the step S3 for the row, and if no, then determine whether the new Value of the row is the same as the corresponding Value stored in the Redis, and if said values are different, then overwrite the corresponding Value in the Redis by the new Value of the row, while splicing the row into a standard "UPDATE" SQL statement to update the row in the corresponding table of the aggregation database.

(S5) performing a difference set calculation for the primary key set of all tables of the target database data after the change occurs and the primary key set of the table corresponding to the aggregation database obtained in the step S4, and if an element exists in the difference set, generating a standard "DELETE" SQL statement in the corresponding table of the aggregation database to delete the data in the aggregation database corresponding to the already deleted data of the target database.

In the Redis-based database data aggregation and synchronization method of the present invention, the synchronization program scans the primary key field of the database table.

In the Redis-based database data aggregation and synchronization method of the present invention, the method of calculating the Key and Value of each row in the step (S2) firstly obtains a unique identified string Value of each row by using a MD5 algorithm, and then uses the table name to splice the primary key field value of the row to obtain a unique string Key.

The present invention has the following advantages:

In the Redis-based database data aggregation and synchronization method of the present invention, the synchronization program scans the data in the table of the target database, calculates and stores the Key and Value of each row into the Redis, while splicing the row into the aggregation database, and when there is a change of data in the table of the target database, and the synchronization program carries out the steps of re-calculating a new Key and a new Value of each row in the target database, inquires whether a key same as the new Key exists in the Redis to update the data in the aggregation database, storing the new Key and new Value into the Redis if such key does not exist, while writing the row into the aggregation database, determining whether or not the new Value is the same as the Value stored in the Redis if such key exists, overwriting the new Value into the corresponding Value in the Redis if the aforementioned values are different, while updating the row into the aggregation database, performing a difference set calculation of the primary key set of the table after the synchronization of the target database data completes and the corresponding primary key set of the table of the aggregation database, deleting the data from the aggregation database by determining whether or not an element exists in the difference set, and achieving the Insert, Update, and Delete functions in aggregation and synchronization process through the Redis, so as to aggregate a number of target database data into an aggregation database and create the data required by a data warehouse or BI platform easily.

DETAILED DESCRIPTION OF THE PREFERRED EMBODIMENTS

The technical measures, characteristics, and objectives of the present invention will become clearer in light of the following detailed description of an illustrative embodiment of this invention. It is intended that the embodiments disclosed herein are to be considered illustrative rather than restrictive.

Figure 1:
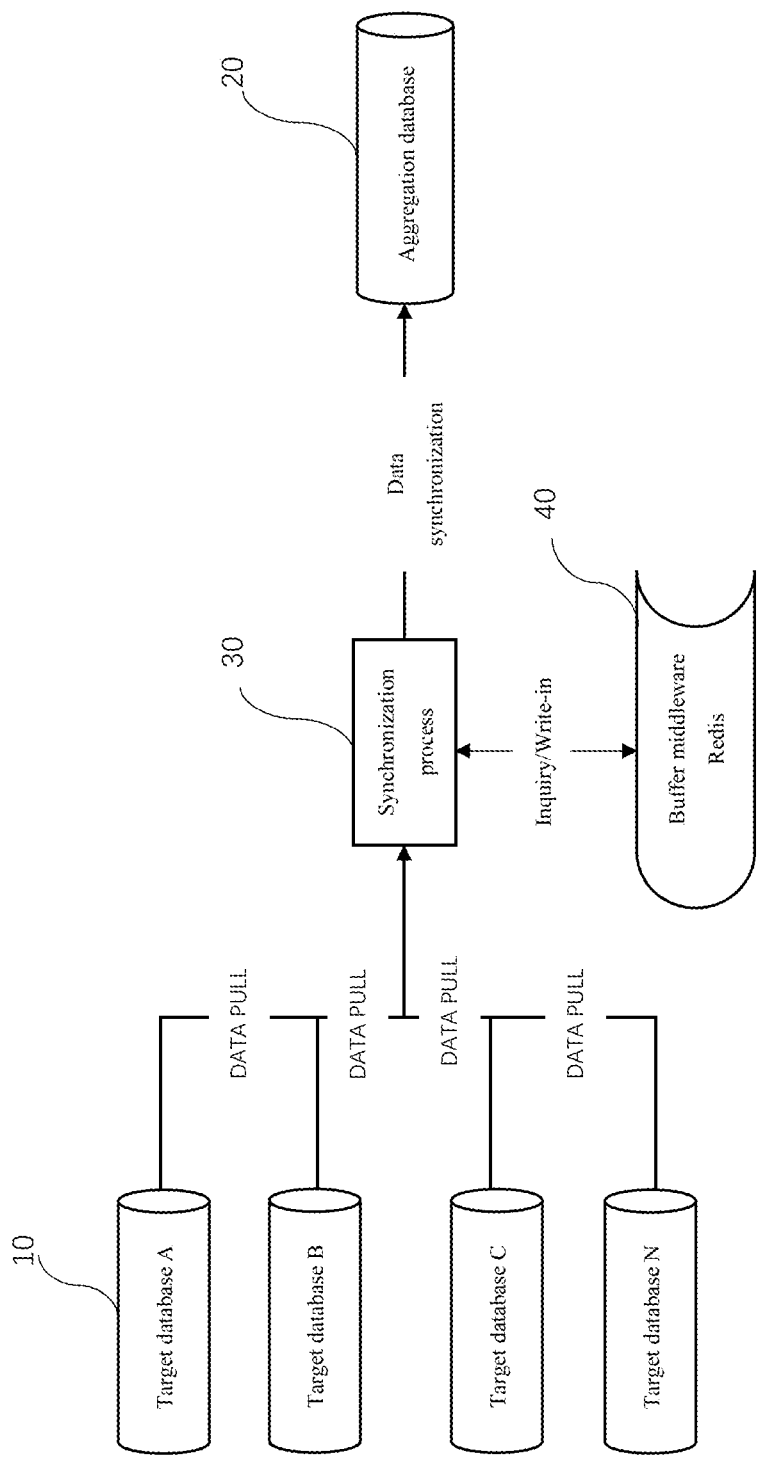
FIG. 1 is a relation diagram of a Redis-based database data aggregation and synchronization method of the present invention.

With reference to FIG. 1 for a Redis-based database data aggregation and synchronization method used for aggregating and synchronizing at least a target database data into an aggregation database in accordance with the present invention, one or more target databases 10 are source databases requiring to synchronize data into an aggregation database 20.

The aggregation database 20 stores the same data which are synchronized from the target database 10, and the aggregation database 20 has the same sub-database type, data table space, and specific data content as those of the target database 10.

The synchronization program 30 carries out a program process for aggregating and synchronizing the data of the target database 10 into the aggregation database 20.

The Redis 40 stores the fetched data when the synchronization program 30 executes the operation, and provides the data for the inquiry by the synchronization program 30.

Figure 2:
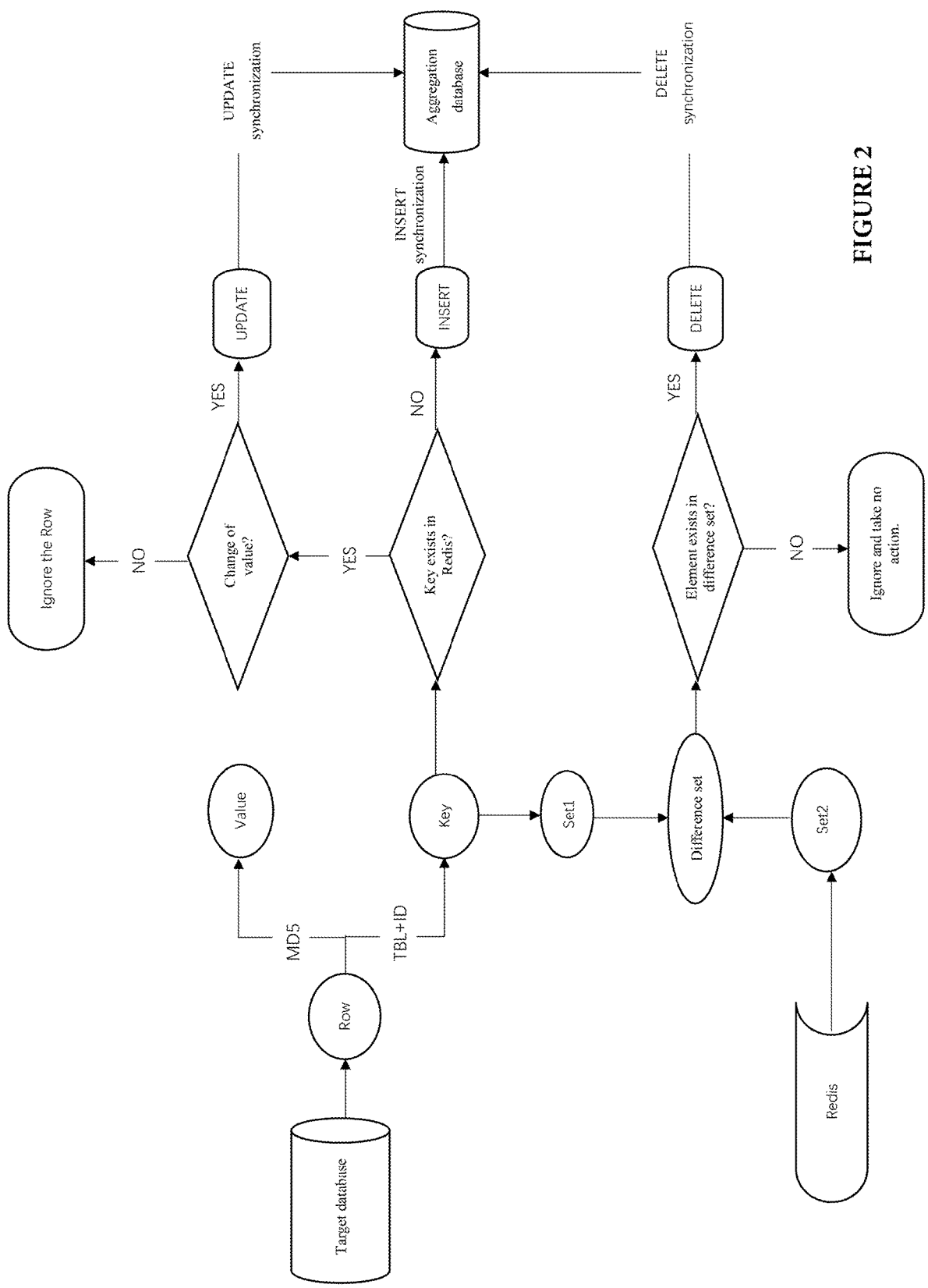
FIG. 2 is a logic diagram of processing a synchronization program of the present invention.

With reference to FIG. 2 for the Redis-based database data aggregation and synchronization method in accordance with the present invention, the method comprises the following steps:

(S1) Use the synchronization program 30 to load the remote connection information of each target database 10 from a configuration file, read a table structure of the target database 10, fetch a field and primary key information of each table, and create a corresponding table structure in the aggregation database 20.

(S2) Scan data of all tables of the target database 10 by the synchronization program 30, and then calculate the Key and Value of all rows row by row. The synchronization program 30 scans the target database 10 according to the primary key field of the database table. The method of calculating the Key and Value of each row is described as follows: Firstly, each row uses a MD5 algorithm to obtain a unique identified string Value, and then uses a table name to splice the primary key field value (such as "TBL+ID" as shown in FIG. 2) of the row to obtain a unique string Key.

The MD5 algorithm is an abbreviation of the Message-Digest Algorithm 5, which is a hash function extensively used in the area of computer security.

(S3) Use the Key and Value obtained from the step (S2) as the k-v to be cached and written into the Redis, splice the rows of all tables of the target database 10 into a standard "INSERT" SQL statement to be executed and written into a corresponding table of the aggregation database 20, and complete the new INSERT synchronization between the table of the target database 10 and the aggregation database 20.

(S4) Execute the step (S2) to obtain a new Value and a new Key when there is a change of data in the table of the target database, and determine whether or not a key of each row same as the new key of the row exists in the Redis, and if yes, then execute the step (S3) for the row, and if no, then determine whether the new Value of the row is the same as the corresponding Value stored in the Redis, and if said values are different, then overwrite the corresponding Value in the Redis by the new Value of the row, while splicing the row into a standard "UPDATE" SQL statement to update the row in the corresponding table of the aggregation database 20, and if said values are different, then the row will not be processed, so as to complete all update synchronizations between the target database 10 and the aggregation database 20. The step is provided for updating a change in a row of the table in the target database 10 (when there is a change in the row).

(S5) Perform a difference set calculation for the primary key set (Set 1) in all tables of the data of the target database after the change of data occurs and the primary key set (Set2) of the table corresponding to the aggregation database 20 obtained in the step (S4) to obtain a difference set, and if an element exists in the difference set, generate a standard "DELETE" SQL statement in the corresponding table of the aggregation database 20 to delete the data in the aggregation database 20 corresponding to the already deleted data of the target database 10, and if the difference set has not element existed therein, then no processing will be required, so as to complete the DELETE synchronization between the target database 10 and the aggregation database 20. The step is provided for deleting the row corresponding to the row deleted row from the target database 10 (which is the deleted row of the target database 10) from the aggregation database 20.

Wherein, the primary key set of the table (set2) corresponding to the aggregation database 20 is the same as the row represented by the Value and Key stored in the Redis. All data of the primary key set of the table (set 1) of the target database 10 are the data of the primary key set of the table of the target database 10 after the change occurs. Since some of the rows of all changed data of the target database 10 may be deleted, therefore if there is an element exists in the difference set between the sell and the set2, then it will show that some rows of the target database 10 are deleted when the change occurs. Now, it is necessary to delete the row corresponding to the aforementioned row in the aggregation database 20 and the target database 10 in order to have the same data in the aggregation database 20 and the target database 10. If no element exists in the difference set, it shows none of the row is deleted when the target database 10 has a change, so that the data in the aggregation database 20 and the data in the target database 10 are the same, and it is not necessary to take any action. The difference set of the sell and the set2 can be carried out by using the Value-Key (representing the set2) stored in the Redis and the Value-Key (representing the set 1) of the target database 10 after the change occurs.

While the invention has been described by means of specific embodiments, numerous modifications and variations could be made thereto by those skilled in the art without departing from the scope and spirit of the invention set forth in the claims. It is noteworthy that the embodiments and figures disclosed herein are to be considered illustrative rather than restrictive.

What is claimed is:

1. A REDIS-based database data aggregation and synchronization method, for aggregating and synchronizing at least a target database data into an aggregation database, comprising the steps of:

(S1) using a synchronization program to load the remote connection information of each target database from a configuration file, reading a table structure of the target database, fetching a field and a primary key information of each table, and creating a corresponding table structure in the aggregation database;

(S2) scanning the data of all tables of the target database by the synchronization program, and then calculating a Key and a Value of all rows row by row;

(S3) using the Key and Value obtained from the step (S2) as a k-v to be cached and written into the REDIS, splicing rows of all tables of the target database into a standard "INSERT" SQL statement to be executed and written into a corresponding table of the aggregation database;

(S4) executing the step (S2) to obtain a new Value and a new Key when there is a change of data in the table of the target database, and determining whether or not a key of each row that is same as the new key of a row exists in the REDIS, and if yes, then executing the step (S3) for the row, and if no, then determining whether the new Value of the row is the same as the corresponding Value stored in the REDIS, and if said new Value is different, then overwriting the corresponding Value in the REDIS by the new Value of the row, while splicing the row into a standard "UPDATE" SQL statement to update the row in the corresponding table of the aggregation database;

(S5) performing a difference set calculation for a primary key set of all tables of the target database data after the change occurs and the primary key set of the table corresponding to the aggregation database obtained in the step (S4), and if an element exists in the difference set, generating a standard "DELETE" SQL statement in the corresponding table of the aggregation database to delete the data in the aggregation database corresponding to the already deleted data of the target database.

2. The REDIS-based database data aggregation and synchronization method according to claim 1, wherein the synchronization program scans the primary key set of the table of the database in the step (S2).

3. The REDIS-based database data aggregation and synchronization method according to claim 1, wherein the method of calculating the Key and Value of each row in the step (S2) firstly obtains a unique identified string Value of each row by using a Message-Digest Algorithm 5 (MD5), and then uses a table name to splice the primary key set of the row to obtain a unique string Key.

* * * * *